(12) United States Patent
Tsai et al.

(10) Patent No.: US 11,316,453 B2
(45) Date of Patent: Apr. 26, 2022

(54) CONTROL SYSTEM AND METHOD FOR POWER-DRIVEN NAIL GUN

(71) Applicant: BASSO INDUSTRY CORP., Taichung (TW)

(72) Inventors: Cheng-En Tsai, Taichung (TW); Chun-Min Shih, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 16/932,962

(22) Filed: Jul. 20, 2020

(65) Prior Publication Data
US 2021/0021215 A1    Jan. 21, 2021

(30) Foreign Application Priority Data
Jul. 19, 2019    (TW) .................................. 108125709

(51) Int. Cl.
*H02P 7/29*      (2016.01)
*B25C 1/06*      (2006.01)
*B25C 1/00*      (2006.01)

(52) U.S. Cl.
CPC ............. *H02P 7/2913* (2013.01); *B25C 1/06* (2013.01); *B25C 1/008* (2013.01)

(58) Field of Classification Search
CPC .. H02P 7/2913; H02P 1/00; H02P 1/16; H02P 1/163; H02P 1/18; H02P 1/24; H02P 1/26; H02P 1/28; H02P 1/42; H02P 1/46; H02P 1/465; H02P 3/00; H02P 6/00; H02P 6/006; H02P 6/04; H02P 6/06; H02P 6/08; H02P 6/12; H02P 6/14; H02P 6/15; H02P 6/16; H02P 6/26; H02P 6/32; H02P 7/06; H02P 7/265; H02P 7/29; H02P 7/305; H02P 27/00; H02P 27/04; H02P 27/06; H02P 27/08; H02P 21/00; H02P 23/00; H02P 29/00; H02P 27/085; B25C 1/008; B25C 1/06; B25C 1/001
See application file for complete search history.

(56) References Cited

U.S. PATENT DOCUMENTS

| | | | |
|---|---|---|---|
| 10,295,990 B2 * | 5/2019 | Dey, IV | G05B 19/4155 |
| 2005/0217875 A1 | 10/2005 | Forster et al. | |
| 2009/0255972 A1 * | 10/2009 | Shima | B25C 5/1689 227/2 |

* cited by examiner

*Primary Examiner* — Antony M Paul
(74) *Attorney, Agent, or Firm* — Mark M. Friedman (57) ABSTRACT

Provided is a control system and method for a power-driven nail gun, which includes a battery, a motor, a flywheel rotating along with the motor, an impacting member receiving kinetic energy of the flywheel and a nail channel providing a channel for a nail to move along therewith when hit by the impacting member. The method includes utilizing a microcontroller to provide a pulse width modulation (PWM) signal for a driving circuit to drive the motor based on the PWM signal; and in response to reaching a target rotation speed by the motor, utilizing the microcontroller to output a corresponding PWM duty to the driving circuit based on the voltage of the battery, to make the motor maintain at the target rotation speed. The nails obtain stable and consistent kinetic energy and stability of nail firing is effectively improved.

10 Claims, 5 Drawing Sheets

CONTROL SYSTEM AND METHOD FOR POWER-DRIVEN NAIL GUN

CROSS REFERENCE TO RELATED APPLICATION

This application claims the benefit of Taiwan Application No. 108125709, filed on Jul. 19, 2019, titled "CONTROL SYSTEM AND METHOD FOR POWER-DRIVEN NAIL GUN". The entire disclosures of the application are incorporated herein by reference.

TECHNICAL FIELD

The present application relates to power tool technologies, and more particularly to a control system and method for a power-driven nail gun.

BACKGROUND

The stability of firing a nail or nails using a power-driven nail gun directly relates to kinetic energy imparted to the nail(s). If the kinetic energy given to the nail is too large, the depth the nail gets into a workpiece will go too far; if the kinetic energy given to the nail is insufficient, the depth the nail gets into a workpiece will go too shallow. Therefore, how to maintain the stability of nail firing is an important issue in developing power-driven nail guns.

In the power-driven nail gun, the kinetic energy required for nail firing is provided by a motor. If rotation speed of the motor maintains at a fixed or constant speed (i.e., operating at a constant rotation speed) during the nail firing, the kinetic energy of the nail can keep at a constant. In this way, the depth the nail gets into the workpiece is kept in consistency and the stability of nail firing using the power-driven nail gun is improved.

In conventional skills, a closed loop proportional (P) control or proportional integral (PI) control is generally utilized for a constant rotation speed control. These control approaches will have a problem of bounce and restabilization of the rotation speed. That is, the motor rotation speed goes up and then falls down, and at last moves towards balance, and reaches a target rotation speed at the balance. However, in order to meet a user's demand for a quick nail firing, the power-driven nail gun usually needs a user to fire the nail within a very short time period (e.g., three or five seconds) after the motor is activated. The motor will automatically stop after this time period. Therefore, the motor of the power-driven nail gun needs to reach a fixed or constant rotation speed in a very short time. In using the proportional control or proportional integral control, the rotation speed of the motor may have not reached the balance at the time a user fires a nail. The nail may encounter a high rotation speed and thus have excessive kinetic energy or may encounter a low rotation speed and thus have insufficient kinetic energy such that the depth the nail gets into the workpiece is inconsistent and this affects the stability of nail firing using the power-driven nail gun.

SUMMARY

The objective of the present application is to provide a control system and method for a power-driven nail gun, for solving the problem of bounce and restabilization of motor rotation speed, caused by using existing proportional control or proportional integral (PI) control, thereby improving stability of nail firing using the power-driven nail gun.

To achieve above objective, in an aspect, the present application provides a control system for a power-driven nail gun, the power-driven nail gun including a battery, a motor, a flywheel rotating along with the motor, an impacting member receiving kinetic energy of the flywheel and a nail channel providing a channel for a nail to move along a nail hitting direction when hit by the impacting member, the control system including:

a driving circuit, configured to drive the motor;

a microcontroller, connected to the driving circuit, configured to provide a pulse width modulation (PWM) signal to the driving circuit for the driving circuit to drive the motor based on the PWM signal;

a coil position detecting circuit, connected to the motor and the microcontroller, configured to provide the microcontroller with a signal related to rotation speed of the motor; and a battery voltage detecting circuit, connected between the battery and the microcontroller, configured to detect a voltage of the battery, wherein in response to reaching a target rotation speed by the motor, the microcontroller outputs a corresponding PWM duty to the driving circuit based on the voltage of the battery detected by the battery voltage detecting circuit, to make the motor maintain at the target rotation speed.

In the control system of the present application, the voltage of the battery is detected by the battery voltage detecting circuit at the time the motor stops.

In the control system of the present application, the lower the voltage of the battery, the larger the corresponding PWM duty outputted by the microcontroller; the higher the voltage of the battery, the smaller the corresponding PWM duty outputted by the microcontroller.

In the control system of the present application, the corresponding PWM duty outputted by the microcontroller is obtained from a look-up table of the voltage of the battery and the PWM duty.

In the control system of the present application, after the motor reaches the target rotation speed, the microcontroller determines whether the rotation speed of the motor is lower than a predetermined lower threshold, and the microcontroller adds a compensation value to the corresponding PWM duty as a current PWM duty in response to the rotation speed of the motor lower than the predetermined lower threshold, to make the rotation speed of the motor increase.

In the control system of the present application, the microcontroller determines whether the rotation speed of the motor is higher than a predetermined upper threshold, and subtracts the compensation value from the current PWM duty in response to the rotation speed of the motor higher than the predetermined upper threshold, to make the rotation speed of the motor decrease.

In another aspect, the present application provides a control method for a power-driven nail gun, the power-driven nail gun including a battery, a motor, a flywheel rotating along with the motor, an impacting member receiving kinetic energy of the flywheel and a nail channel providing a channel for a nail to move along a nail hitting direction when hit by the impacting member, the control method including:

detecting a voltage of the battery;

utilizing a microcontroller to provide a pulse width modulation (PWM) signal to a driving circuit for the driving circuit to drive the motor based on the PWM signal;

detecting rotation speed of the motor; and in response to reaching a target rotation speed by the motor, utilizing the microcontroller to output a corresponding PWM duty to the driving circuit based on the voltage of the battery, to make the motor maintain at the target rotation speed.

In the control method of the present application, in the step of detecting the rotation speed of the motor, the voltage of the battery is detected at the time the motor stops.

In the control method of the present application, the lower the voltage of the battery, the larger the corresponding PWM duty outputted by the microcontroller; the higher the voltage of the battery, the smaller the corresponding PWM duty outputted by the microcontroller.

In the control method of the present application, the step of utilizing the microcontroller to output the corresponding PWM duty to the driving circuit based on the voltage of the battery includes:

obtaining the corresponding PWM duty from a look-up table of the voltage of the battery and the PWM duty.

In the control method of the present application, after the motor reaches the target rotation speed, the method further includes:

determining whether the rotation speed of the motor is lower than a predetermined lower threshold; and in response to the rotation speed of the motor lower than the predetermined lower threshold, utilizing the microcontroller to add a compensation value to the corresponding PWM duty as a current PWM duty, to make the rotation speed of the motor increase.

In the control method of the present application, the method further includes:

determining whether the rotation speed of the motor is higher than a predetermined upper threshold; and in response to the rotation speed of the motor higher than the predetermined upper threshold, utilizing the microcontroller to subtract the compensation value from the current PWM duty, to make the rotation speed of the motor decrease.

Above all, the present application provides a control system and method for a power-driven nail gun. During the motor is activated to prepare for firing a nail or nails, motor rotation speed arrives at a target rotation speed, and after that, in order to keep the motor operating at the target rotation speed, PWM duty is adjusted based on the size of a battery voltage in response to reaching the target rotation speed by the motor. The higher the battery voltage, the smaller the PWM duty; the lower the battery voltage, the larger the PWM duty. The motor is driven in such a manner such that the motor quickly reaches a fixed or constant rotation speed for nail firing. Therefore, the nails obtain stable and consistent kinetic energy and stability of hitting the nails using the power-driven nail gun is effectively improved. The control system and method of the present application solves the problem of bounce and restabilization of motor rotation speed, caused by using existing proportional control or proportional integral (PI) control, resulted in low stability of nail firing.

DETAILED DESCRIPTION

The present application provides a control system and method for a power-driven nail gun, which enables a motor to reach constant rotation speed by outputting various pulse width modulation (PWM) duties based on different battery voltage levels. Specifically, when rotation speed of the motor reaches a target rotation speed, the PWM duty is adjusted based on the size of battery voltage to drive the motor for the motor to reach the constant rotation speed.

The control system and method of the present application can solve the problem of bounce and restabilization of rotation speed of the motor, caused by using existing proportional control or proportional integral (PI) control, and thus improves stability of hitting nails using the power-driven nail gun.

Figure 1:
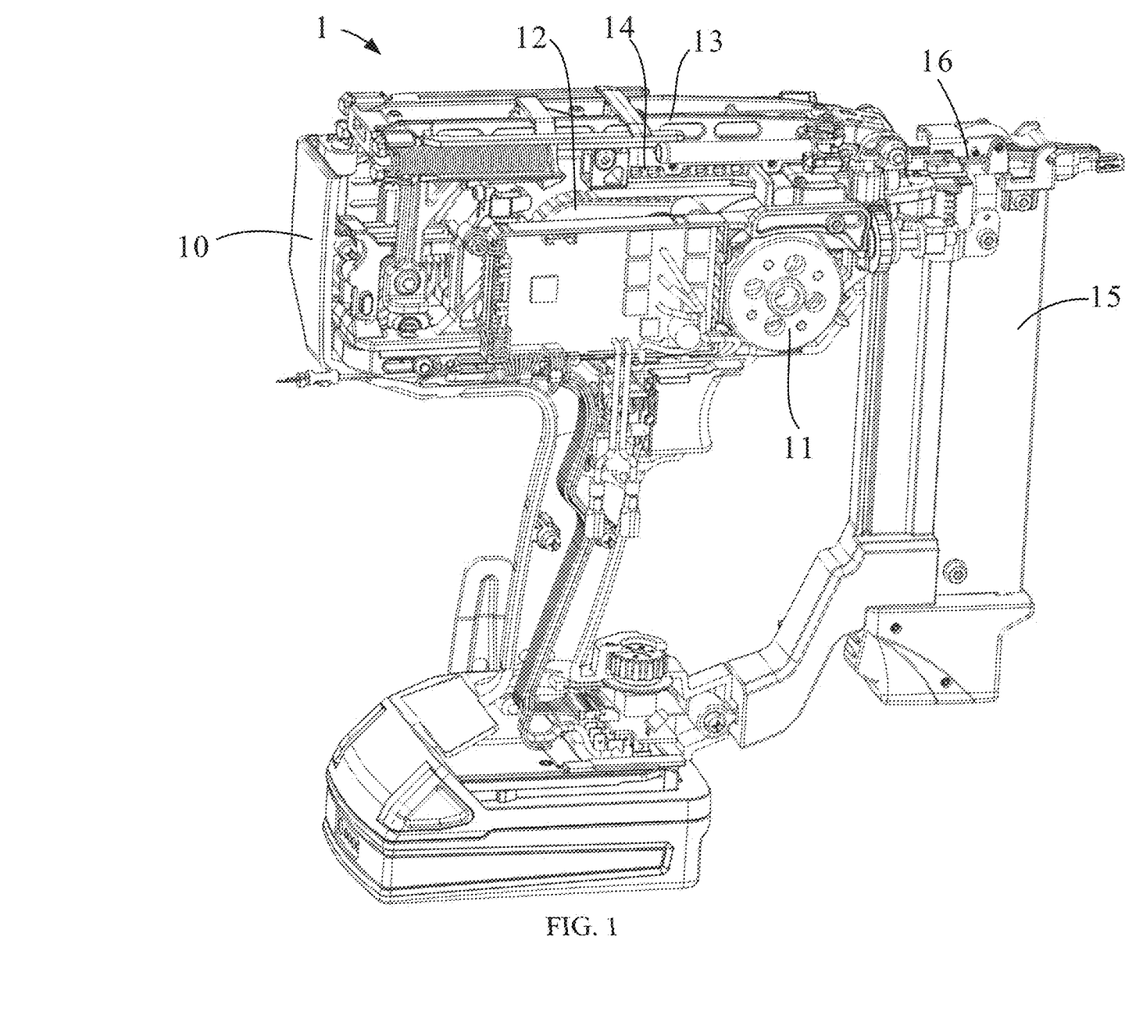
FIG. 1 is a schematic diagram illustrating a power-driven nail gun according to the present application.

FIG. 1 is a schematic diagram illustrating a power-driven nail gun 1 according to the present application. As shown in FIG. 1, the power-driven nail gun 1 includes a frame 10, a motor 11 mounted on the frame 10, a flywheel 12 rotating along with the motor 11, a swing arm 13 disposed with respect to the flywheel 12, an impacting member 14 mounted on the swing arm 13, a nail magazine 15 for receiving a plurality of nails, and a nail channel 16 communicating with the nail magazine 15.

The motor 11 is used to convert electrical energy into kinetic energy to drive the flywheel 12 to rotate. The swing arm 13 is pivotally mounted on the frame 10 and is spaced from the flywheel 12 for a scalable distance. The impacting member 14 slides on the swing arm 13. The nail magazine 15 is connected to the nail channel 16. The nails can be transported one by one to enter the nail channel 16 formed at a side of the frame 10, one by one. The impacting member 14 is configured to fire the nails in the nail channel 16.

As the distance between the swing arm 13 and the flywheel 12 decreases, the impacting member 15 comes into contact with the flywheel 12 and momentarily undergoes a thrust force from the flywheel 12 to drive a nail to move in the nail channel 16 along a nail hitting direction, thereby realizing a nail firing operation in an electrical-power-driving manner.

During the nail firing, the kinetic energy is propagated to the nail sequentially via the motor 11, the flywheel 12 and the impacting member 14. The kinetic energy of the motor 11 depends directly on the rotation speed. If the nail is fired when the motor 11 is at a fixed or constant speed, the nail can have stable kinetic energy and thus the depth the nail gets into a workpiece can be consistent. In the present application, when the motor 11 reaches the target rotation speed, the PWM duty is further adjusted such that the motor 11 maintains at the target rotation speed after reaching the target rotation speed, until the nail is hit or the motor 11 stops.

Figure 2:
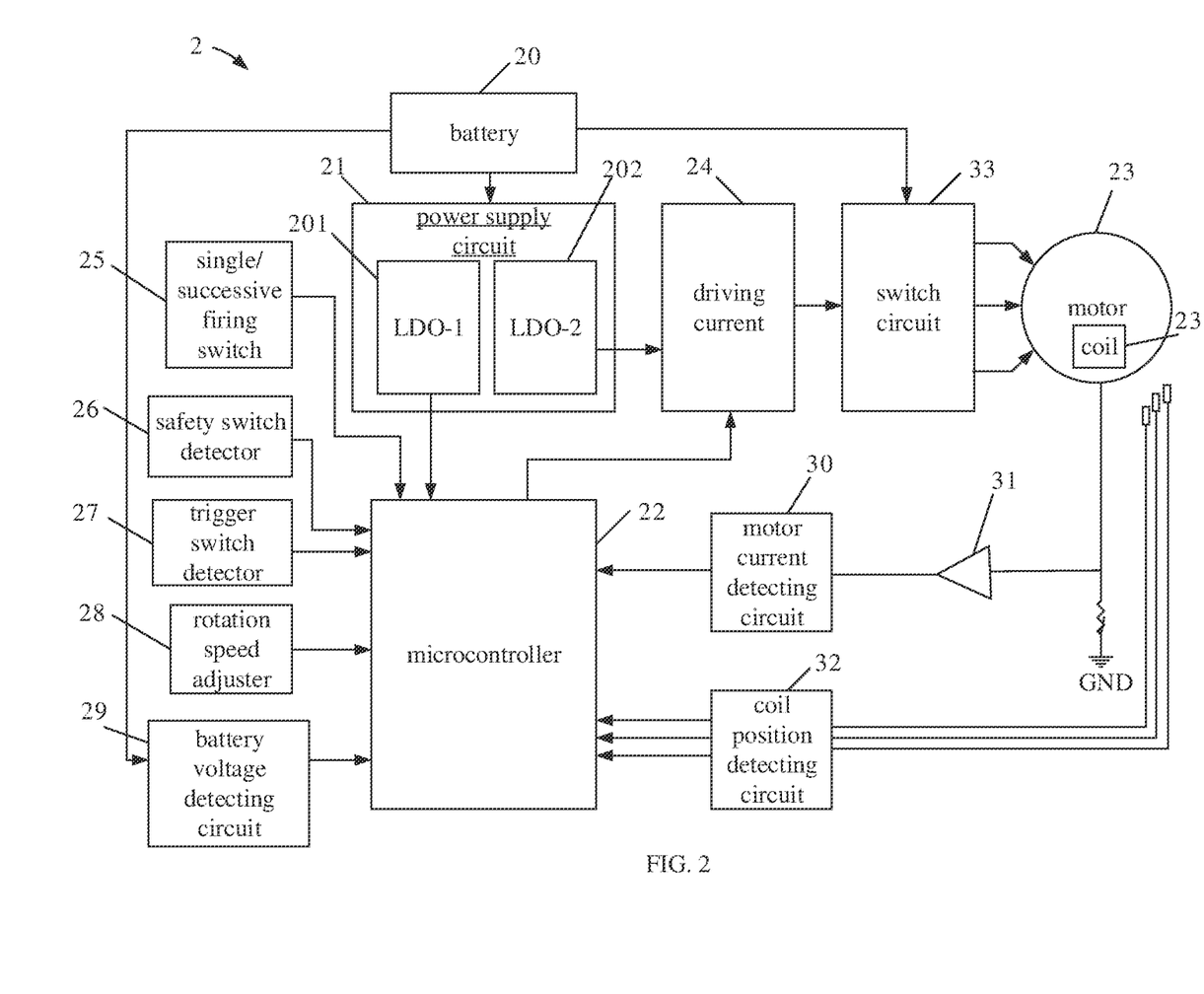
FIG. 2 is a schematic diagram illustrating a control system for a power-driven nail gun according to the present application.

FIG. 2 is a schematic diagram illustrating a control system 2 for a power-driven nail gun according to the present application. As shown in FIG. 2, in this control system 2, a battery 20 supplies power to components of the control system 2 through a power supply circuit 21. The power supply circuit 21 may include two low-dropout regulators (LDOs), that is, LDO-1 201 and LDO-2 202, that provide different power supply voltages. The LDO-1 201 supplies power to a microcontroller (MCU) 22 (with 5V, for example) and LDO-2 202 supplies power to a driving circuit 24 of a motor 23. The motor 23 is a brushless DC motor, for example.

The microcontroller 22 will output a PWM signal to the driving circuit 24 of the motor 23, so that the driving circuit 24 drives the motor 23 according to duty ratio of the PWM signal, thereby controlling the operation of the motor 23 and making the motor 23 reach the target rotation speed.

The microcontroller 22 is connected to a single/successive firing switch 25, a safety switch detector 26 and a trigger switch detector 27. The single/successive firing switch 25 is configured to detect a single firing mode and a successive firing mode. Depending on different firing mode, the microcontroller 22 generates various control flows. The single firing mode is directed to firing a single nail once and the successive firing mode is directed to firing nails successively. The safety switch detector 26 is configured to detect whether a user switches on a safety switch and the trigger switch detector 27 is configured to detect whether a user presses a trigger. In a case that a user switches on the safety switch in the single firing mode or presses the trigger in the successive firing mode, the microcontroller 22 outputs a PWM signal to run the motor 23 to fire a nail or nails thereafter.

The microcontroller 22 is connected to a rotation speed adjuster 28. The rotation speed adjuster 28 is configured for a user to set a target rotation speed of the motor 23. That is, a user can set different target rotation speeds of the motor 23 using the rotation speed adjuster 28 such that the motor 23 operates based on the set target rotation speed. In such a way, a user can choose different nail firing functions according to the needs.

The control system 2 further includes a battery voltage detecting circuit 29, which is connected between the battery 20 and the microcontroller 22 and is configured to detect a voltage of the battery 20. After the microcontroller 22 outputs the PWM signal to the driving circuit 24 of the motor 23 to make the motor 23 reach the target rotation speed, the microcontroller 22 further adjusts duty ratio of the PWM signal based on the voltage of the battery 20 detected by the battery voltage detecting circuit 29, to make the motor 23 keep operating at the target rotation speed.

In addition, a coil position detecting circuit 32 is configured to detect the position of a coil 231 of the motor 23. The coil position detecting circuit 32 may include a Hall sensor, which is used to estimate the rotation speed of the motor 23 by detecting position changes of the coil 231 of the motor 23.

In addition, a motor current detecting circuit 30 is configured to detect a current of the motor 23, and may cooperate with an amplifier 31 to realize the detection. The motor current detecting circuit 30 and the amplifier 31 are connected between the microcontroller 22 and the motor 23. The amplifier 31 amplifies a current from the motor 23 and then the motor current detecting circuit 30 converts an amplified current signal into a digital signal, which is provided to the microcontroller 22 to monitor at any time the size of current flowing through the motor 23. Once the current of the motor 23 is too large, the microcontroller 22 immediately notifies the driving current 24 such that the driving circuit 24 stops the motor 23 by using a switch circuit (which may be a semiconductor switch) 33 to realize over-current protection.

In a case that a user switches on the safety switch in the single firing mode or presses the trigger in the successive firing mode, the microcontroller 22 starts a nail firing process. At first, the microcontroller 22 outputs the PWM signal to the driving circuit 24 of the motor 23 to run the motor 23. The coil position detecting circuit 32 passes the detected position changes of the coil 231 of the motor 23 to the microcontroller 22 for the microcontroller 22 to determine whether the motor 23 reaches the target rotation speed. If the microcontroller 22 determines that the motor 23 has reached the target rotation speed, the microcontroller 22 outputs a corresponding PWM duty to the driving circuit 24 of the motor 23 based on the size of voltage of the battery 20 detected by the battery voltage detecting circuit 29, to make the motor 23 keep operating at the target rotation speed.

Figure 3:
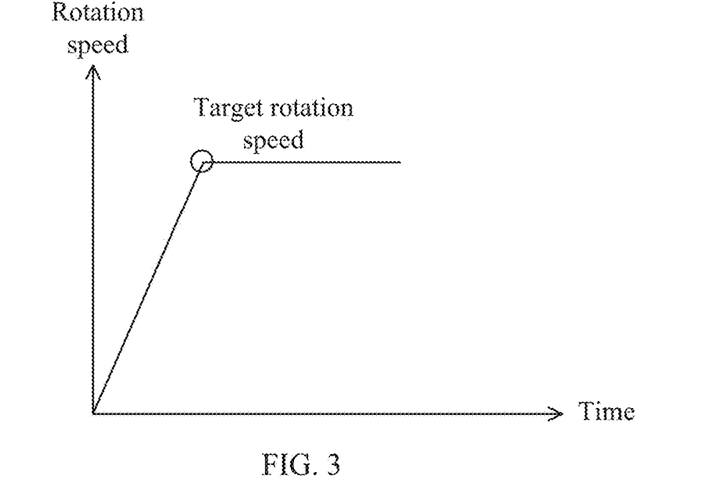
FIG. 3 is a schematic diagram illustrating motor rotation speed varying with time according to the present application.

FIG. 3 is a schematic diagram illustrating motor rotation speed varying with time according to the present application. As shown in FIG. 3, at the time the motor 23 just reaches the target rotation speed, the PWM duty is changed, that is, outputting the corresponding PWM duty based on the size of voltage of the battery 20. The PWM duty maintains unchanged after that.

Before the motor 23 reaches the target rotation speed, a large current may be supplied to the motor 23 first for resisting an initial load. Then, the duty ratio of the PWM signal outputted to the driving circuit 24 of the motor 23 by the microcontroller 22 can be a fixed or constant value, or the duty ratio increases continuously but increments of the duty ratio are fixed, such that the rotation speed of the motor 23 increases to reach the target rotation speed.

Detecting the size of voltage of the battery 20 by the battery voltage detecting circuit 29 may be executed when the motor 23 stops. This is because fluctuation of the voltage of the battery 20 will be large for that the battery 20 supplies power to a component with a large load during rotation of the motor 23. Accordingly, it is preferred for the detection of voltage of the battery 20 to be executed when the motor 23 stops.

After the motor 23 reaches the target rotation speed, the microcontroller 22 outputs the corresponding PWM duty based on the size of voltage of the battery 20 detected by the battery voltage detecting circuit 29, to drive the motor 23. The lower the voltage of the battery 20, the larger the outputted PWM duty; the higher the voltage of the battery 20, the smaller the outputted PWM duty. A to-be-outputted PWM duty may be obtained by looking up a table, which is a look-up table of the voltage of the battery 20 and the PWM duty and may be established based on experimental data. In another embodiment, the to-be-outputted PWM duty depends linearly on the voltage of the battery 20, that is, the to-be-outputted PWM duty is inversely proportional to the voltage of the battery 20. The to-be-outputted PWM duty may also be obtained by interpolation, based on this linear relationship.

When the voltage of the battery 20 is low, the current supplied to the motor 23 is small and thus the PWM duty outputted by the microcontroller 22 needs to be large to be able to keep the motor 23 operating at the target rotation speed. When the voltage of the battery 20 is high, the current supplied to the motor 23 is large and thus the PWM duty outputted by the microcontroller 22 does not need to be large for the motor 23 to be kept operating at the target rotation speed.

Assuming that a possible voltage of the battery 20 is within a range of 16V to 21V, experiments may be taken at 0.5V intervals in establishing the look-up table so as to obtain the PWM duty needed to be used to keep the motor 23 operating at the target rotation speed, under a corresponding battery voltage. For all possible battery voltages, corresponding values of PWM duty are obtained in such a manner, thereby establishing the look-up table.

Figure 4:
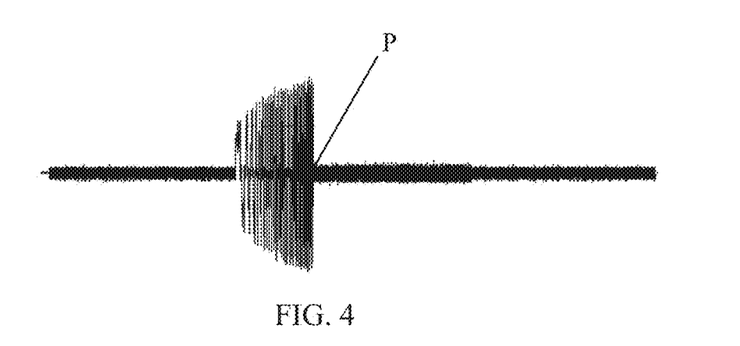
FIG. 4 is a schematic diagram illustrating a current flowing through a motor, varying with time according to the present application.

FIG. 4 is a schematic diagram illustrating a current flowing through a motor, varying with time according to the present application. Point P shown in FIG. 4 is a PWM duty switching point, that is, the PWM duty outputted by the microcontroller 22 is changed to an output that is based on the size of voltage of the battery 20 when a corresponding rotation speed of the motor 23 just arrives at the target rotation speed. It can be seen from FIG. 4 that the current flowing through the motor 23 rapidly decreases at the PWM duty switching point (i.e., Point P). This means it no longer needs to supply a large current to the motor 23 to keep at the target rotation speed after the motor 23 reaches the target rotation speed.

Figure 5:
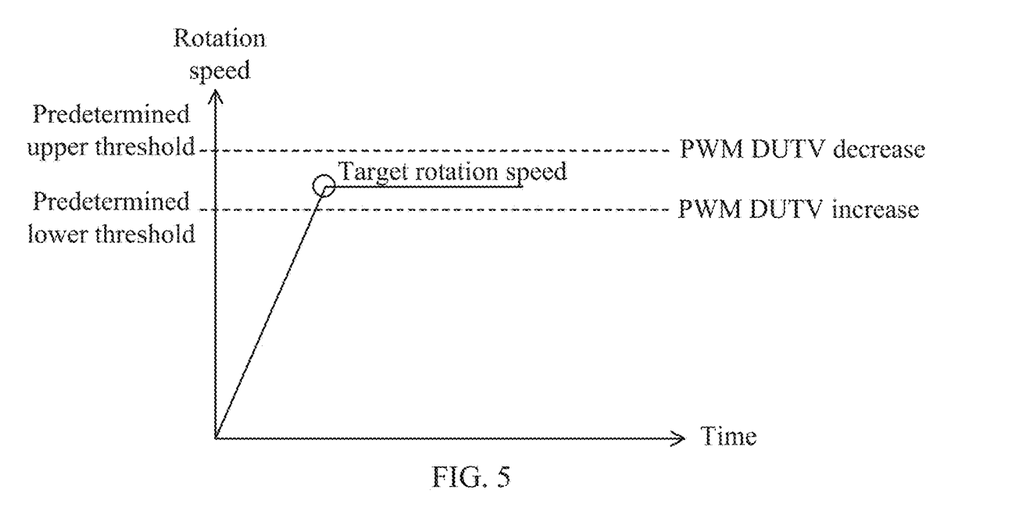
FIG. 5 is a schematic diagram illustrating motor rotation speed varying with time according to the present application.

FIG. 5 is a schematic diagram illustrating motor rotation speed varying with time according to the present application. As described above, a user may set different target rotation speeds for the motor 23 by using the rotation speed adjuster 28, to make the motor 23 operate based on the set target rotation speed. In a case that the target rotation speed of the motor 23 set by a user is low, after the motor 23 reaches the target rotation speed, the rotation speed of the motor 23 may immediately drop due to insufficient inertial force at a switching time point of the PWM duty. In order to improve this drawback, it can set a predetermined upper threshold above the target rotation speed (i.e., the predetermined upper threshold is greater than the target rotation speed) and a predetermined lower threshold below the target rotation speed (i.e., the predetermined lower threshold is less than the target rotation speed). In response to the rotation speed of the motor 23 lower than the predetermined lower threshold after the target rotation speed is reached, the PWM duty is adjusted to be a PWM duty corresponding to the target rotation speed plus a compensation value (e.g., 5%), to increase the rotation speed of the motor 23. After that, if the rotation speed of the motor 23 increases to exceed the predetermined upper threshold, subtract the compensation value such that an obtained PWM duty is the PWM duty corresponding to the target rotation speed. In such a manner, the rotation speed of the motor 23 is controlled to be within a range between an upper limit and a lower limit of the target rotation speed.

Figure 6:
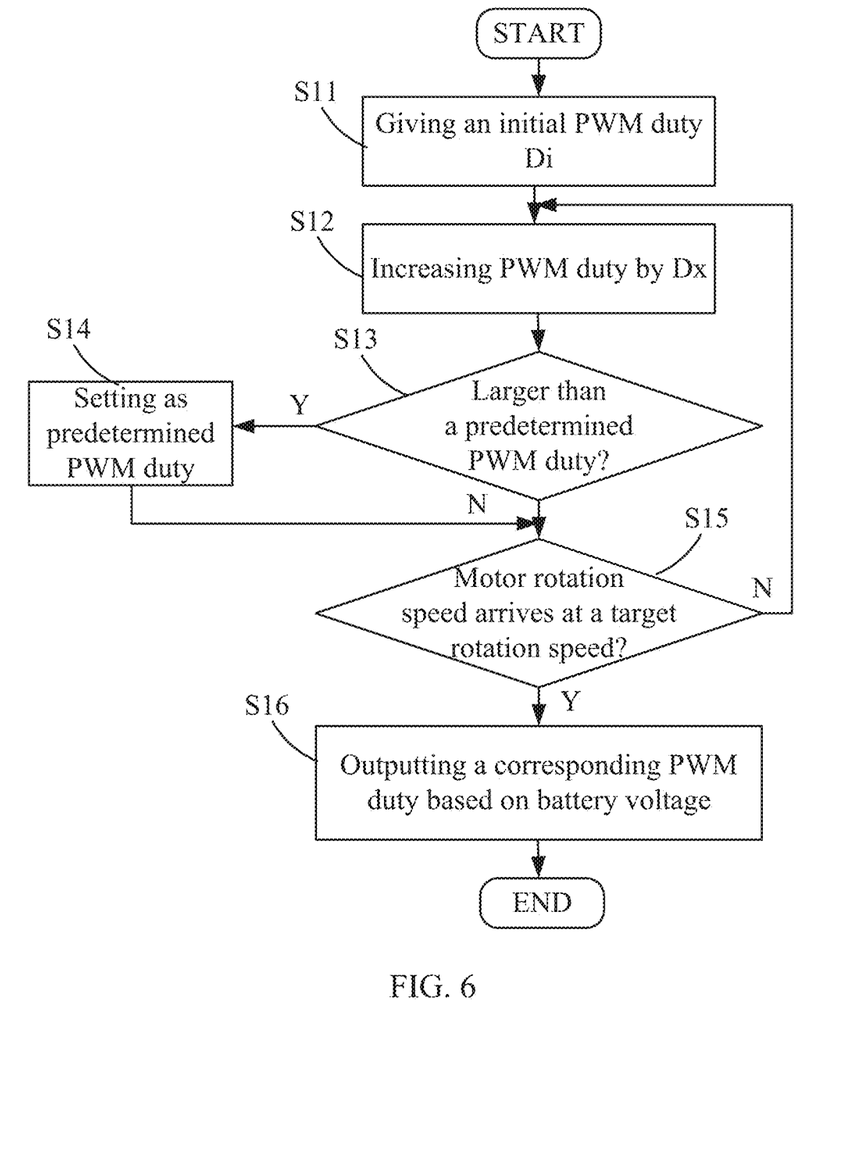
FIG. 6 is a flowchart of a control method for a power-driven nail gun in a first embodiment according to the present application.

FIG. 6 is a flowchart of a control method for a power-driven nail gun in a first embodiment according to the present application. The control flow shown in FIG. 6 is directed to a process of microcontroller 22, which controls operations of the motor 23 in order to prepare kinetic energy for a nail or nails. First of all, in Step S11, the microcontroller 22 outputs an initial PWM duty Di to the driving circuit 24 of the motor 23 for the motor 23 to start to operate. After that, in Step S12, Dx is added to the PWM duty such that a current PWM duty is Di+Dx, which accelerates the rotation of the motor 23. In Step S13, it is to determine whether the current PWM duty is greater than a predetermined PWM duty. If yes, execute Step S14; if no, go to Step S15. In Step S14, the current PWM duty is set to be equal to the predetermined PWM duty. This step is to avoid unlimited PWM duty, which may cause the motor 23 to rotate too fast. In Step S15, it is to determine whether the rotation speed of the motor 23 reaches the target rotation speed. If yes, execute Step S16; if no, execute Step S12. The rotation speed of the motor 23 may be detected by the coil position detecting circuit (e.g., a Hall sensor) 32, and a detected signal is transmitted to the microcontroller 22 to estimate motor rotation speed. If the rotation speed of the motor 23 does not reach the target rotation speed, go back to Step S12 to increase the PWM duty again to increase the rotation speed of the motor 23. In Step S16, based on the size of voltage of the battery 20 detected by the battery voltage detecting circuit 29, the microcontroller 22 outputs a corresponding PWM duty to the driving circuit 24 of the motor 23, to make the motor 23 keep rotating at the target rotation speed. This PWM duty maintains unchanged thereafter.

Figure 7:
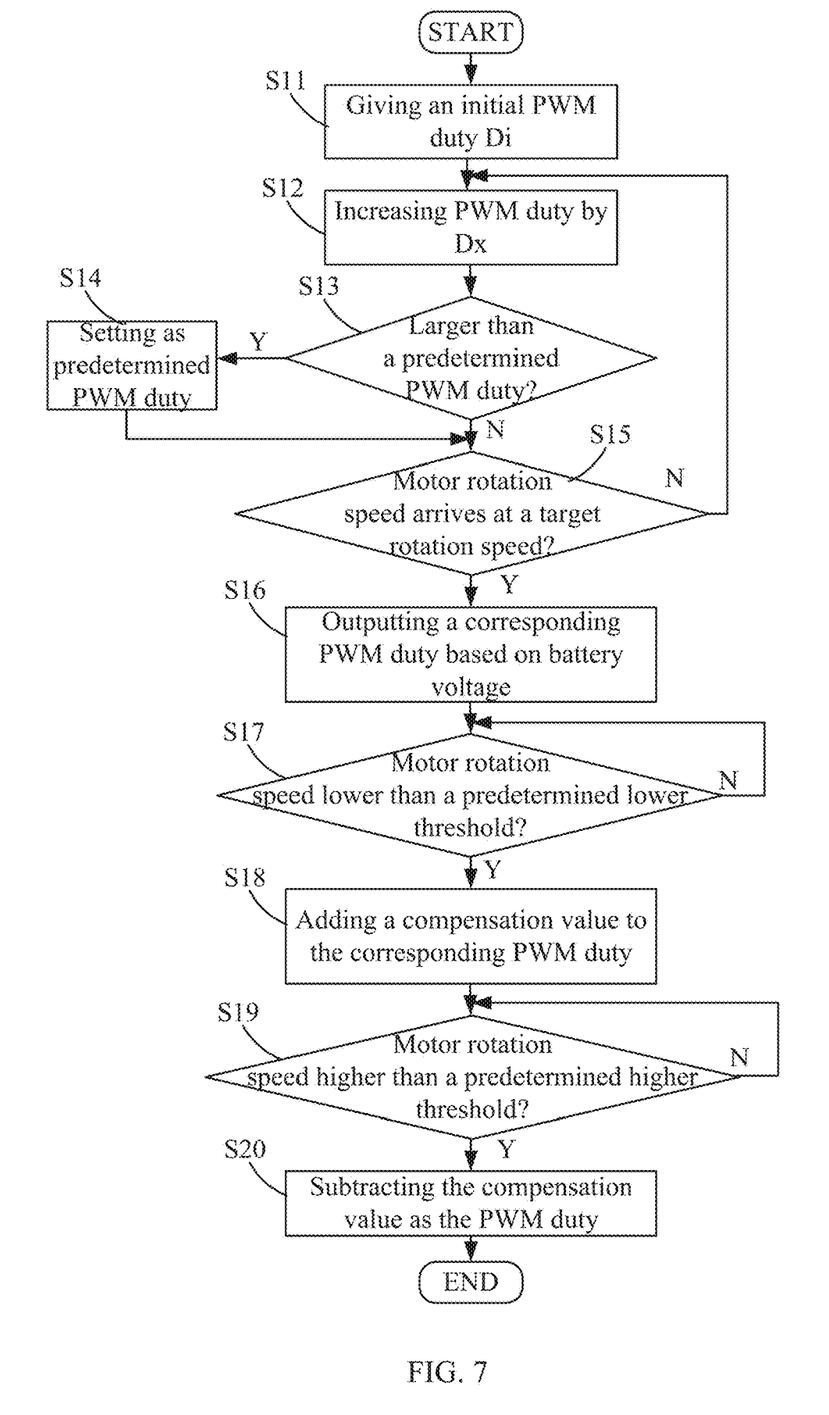
FIG. 7 is a flowchart of a control method for a power-driven nail gun in a second embodiment according to the present application.

FIG. 7 is a flowchart of a control method for a power-driven nail gun in a second embodiment according to the present application. Steps S11 to S16 in the second embodiment of the control method of the present application are identical to that in the first embodiment, and thus are referred to the relevant description of the first embodiment. In Step S17, the microcontroller 22 determines whether the motor rotation speed is less than a predetermined lower threshold. If yes, execute Step S18; if no, continue to detect the motor rotation speed. In Step S18, a compensation value (e.g., 5%) is added to the corresponding PWM duty that corresponds to the target rotation speed, and the sum serves as a current PWM duty such that the rotation speed of the motor 23 increases. In Step S19, the microcontroller 22 determines whether the motor rotation speed is greater than a predetermined upper threshold. If yes, execute Step S20; if no, continue to detect the motor rotation speed. In Step S20, the compensation value is subtracted such that the current PWM duty changes to the PWM duty corresponding to the target rotation speed, to reduce the rotation speed of the motor 23. By this way, the rotation speed of the motor 23 is controlled within a range between an upper limit and a lower limit of the target rotation speed. This approach is applicable to a case that the target rotation speed of the motor 23 set by a user is low and the motor 23 has insufficient rotational inertial force strength.

Above all, the present application provides a control system and method for a power-driven nail gun. During the motor is activated to prepare for firing a nail or nails, motor rotation speed arrives at a target rotation speed, and after that, in order to keep the motor operating at the target rotation speed, PWM duty is adjusted based on the size of a battery voltage in response to reaching the target rotation speed by the motor. The higher the battery voltage, the smaller the PWM duty; the lower the battery voltage, the larger the PWM duty. The motor is driven in such a manner such that the motor quickly reaches a fixed or constant rotation speed for nail firing. Therefore, the nails obtain stable and consistent kinetic energy and stability of hitting the nails using the power-driven nail gun is effectively improved. The control system and method of the present application solves the problem of bounce and restabilization of motor rotation speed, caused by using existing proportional control or proportional integral (PI) control, resulted in low stability of nail firing.

Above all, while the preferred embodiments of the present application have been illustrated and described in detail, various modifications and alterations can be made by persons of ordinary skill in the art. The embodiment of the present application is therefore described in an illustrative but not restrictive sense. It is intended that the present application should not be limited to the particular forms as illustrated, and that all modifications and alterations which maintain the spirit and realm of the present application are within the scope as defined in the appended claims.

What is claimed is:

1. A control system for a power-driven nail gun, the power-driven nail gun comprising a battery, a motor, a flywheel rotating along with the motor, an impacting member receiving kinetic energy of the flywheel and a nail channel providing a channel for a nail to move along a nail hitting direction when hit by the impacting member, the control system comprising:
   a driving circuit, configured to drive the motor;
   a microcontroller, connected to the driving circuit, configured to provide a pulse width modulation (PWM) signal to the driving circuit for the driving circuit to drive the motor based on the PWM signal;
   a coil position detecting circuit, connected to the motor and the microcontroller, configured to estimate the rotation speed of the motor by detecting position changes of a coil of the motor and provide the microcontroller with a signal related to rotation speed of the motor; and
   a battery voltage detecting circuit, connected between the battery and the microcontroller, configured to detect a voltage of the battery,
   wherein in response to reaching a target rotation speed by the motor, the microcontroller outputs a corresponding PWM duty to the driving circuit based on the voltage of the battery detected by the battery voltage detecting circuit, to make the motor maintain at the target rotation speed,
   wherein the lower the voltage of the battery, the larger the corresponding PWM duty outputted by the microcontroller; the higher the voltage of the battery, the smaller the corresponding PWM duty outputted by the microcontroller.

2. The system according to claim 1, wherein the voltage of the battery is detected by the battery voltage detecting circuit at the time the motor stops.

3. The system according to claim 1, wherein the corresponding PWM duty outputted by the microcontroller is obtained from a look-up table of the voltage of the battery and the PWM duty.

4. The system according to claim 1, wherein after the motor reaches the target rotation speed, the microcontroller determines whether the rotation speed of the motor is lower than a predetermined lower threshold, and the microcontroller adds a compensation value to the corresponding PWM duty as a current PWM duty in response to the rotation speed of the motor lower than the predetermined lower threshold, to make the rotation speed of the motor increase.

5. The system according to claim 4, wherein the microcontroller determines whether the rotation speed of the motor is higher than a predetermined upper threshold, and subtracts the compensation value from the current PWM duty in response to the rotation speed of the motor higher than the predetermined upper threshold, to make the rotation speed of the motor decrease.

6. A control method for a power-driven nail gun, the power-driven nail gun comprising a battery, a motor, a flywheel rotating along with the motor, an impacting member receiving kinetic energy of the flywheel and a nail channel providing a channel for a nail to move along a nail hitting direction when hit by the impacting member, the control method comprising:
   detecting a voltage of the battery;
   utilizing a microcontroller to provide a pulse width modulation (PWM) signal to a driving circuit for the driving circuit to drive the motor based on the PWM signal;
   detecting rotation speed of the motor; and
   in response to reaching a target rotation speed by the motor, utilizing the microcontroller to output a corresponding PWM duty to the driving circuit based on the voltage of the battery, to make the motor maintain at the target rotation speed,
   wherein the lower the voltage of the battery, the larger the corresponding PWM duty outputted by the microcontroller; the higher the voltage of the battery, the smaller the corresponding PWM duty outputted by the microcontroller.

7. The method according to claim 6, wherein in the step of detecting the rotation speed of the motor, the voltage of the battery is detected at the time the motor stops.

8. The method according to claim 6, wherein the step of utilizing the microcontroller to output the corresponding PWM duty to the driving circuit based on the voltage of the battery comprises:
   obtaining the corresponding PWM duty from a look-up table of the voltage of the battery and the PWM duty.

9. The method according to claim 6, wherein after the motor reaches the target rotation speed, the method further comprises:
   determining whether the rotation speed of the motor is lower than a predetermined lower threshold; and
   in response to the rotation speed of the motor lower than the predetermined lower threshold, utilizing the microcontroller to add a compensation value to the corresponding PWM duty as a current PWM duty, to make the rotation speed of the motor increase.

10. The method according to claim 9, further comprising:
    determining whether the rotation speed of the motor is higher than a predetermined upper threshold; and
    in response to the rotation speed of the motor higher than the predetermined upper threshold, utilizing the microcontroller to subtract the compensation value from the current PWM duty, to make the rotation speed of the motor decrease.

* * * * *